United States Patent
Suzuki et al.

(10) Patent No.: US 9,214,115 B2
(45) Date of Patent: *Dec. 15, 2015

(54) DISPLAY DEVICE

(71) Applicant: Japan Display Inc., Tokyo (JP)

(72) Inventors: Takayuki Suzuki, Mobara (JP);
Hiroyuki Abe, Chiba (JP); Masahiro Maki, Mobara (JP); Mitsuru Goto, Chiba (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,807

(22) Filed: Oct. 29, 2014

(65) Prior Publication Data

US 2015/0054804 A1    Feb. 26, 2015

Related U.S. Application Data

(63) Continuation of application No. 13/851,130, filed on Mar. 27, 2013, now Pat. No. 8,878,815.

(30) Foreign Application Priority Data

Apr. 23, 2012    (JP) .................................. 2012-097266

(51) Int. Cl.
*G06F 3/044*      (2006.01)
*G09G 3/36*       (2006.01)
*G06F 3/041*      (2006.01)

(52) U.S. Cl.
CPC *G09G 3/36* (2013.01); *G06F 3/044* (2013.01); *G06F 3/0418* (2013.01)

(58) Field of Classification Search
CPC ........ G06F 3/044; G06F 3/045; G06F 3/0418
USPC .................... 345/173–179; 178/18.01–18.07, 178/19.01–19.05
See application file for complete search history.

(56) References Cited

U.S. PATENT DOCUMENTS

| | | | |
|---|---|---|---|
| 2004/0041826 A1 | 3/2004 | Nakagawa et al. |
| 2008/0273024 A1 | 11/2008 | Koyama |
| 2008/0284966 A1 | 11/2008 | Ootsu et al. |
| 2010/0052713 A1 | 3/2010 | Kunimori et al. |
| 2010/0182521 A1 | 7/2010 | Inoue et al. |

FOREIGN PATENT DOCUMENTS

JP    2008-83491    4/2008

*Primary Examiner* — Ricardo L Osorio
(74) *Attorney, Agent, or Firm* — Lowe Hauptman & Ham, LLP

(57) ABSTRACT

A display device includes a substrate having an image display area, pixel electrodes formed in the image display area of the substrate, a common electrode formed in the image display area of the substrate, inside signal lines formed inside the image display area of the substrate and electrically connected to the pixel electrodes, outside signal lines formed outside the image display area of the substrate and electrically connected to the inside signal lines, and a common line formed inside and outside the image display area of the substrate and electrically connected to the common electrode. A coupling capacitance is formed between the inside signal lines and the common electrode. The outside signal lines include a first portion, and a second portion that is higher in electric resistance than an electric resistance of the first portion, and the second portion has a bend.

10 Claims, 17 Drawing Sheets

DISPLAY DEVICE

CROSS-REFERENCE TO RELATED APPLICATION

This application is a continuation application of U.S. application Ser. No. 13/851,130, filed Mar. 27, 2013, the contents of which are incorporated herein by reference.

The present application claims priority from Japanese application JP2012-097266 filed on Apr. 23, 2012, the content of which is hereby incorporated by reference into this application.

BACKGROUND OF THE INVENTION

1. Field of the Invention

The present invention relates to a display device.

2. Description of the Related Art

A display device having a touch panel as an interface has been known (JP 2008-83491 A). Among a variety of the touch panels, a capacitance touch panel has been extensively used for a smart phone or the like since the panel operates smoothly only by touching it with a fingertip. The display panel is configured such that a display panel laps over the touch panel.

The display panel is formed with a large number of signal lines that supplies image signals for forming an image, and an electromagnetic wave noise is developed by the image signals. Because the capacitance touch panel needs to detect a slight change in the capacitance, the surrounding noise adversely affects a position detection precision.

As a result of the analysis by the present inventors, it is found that a coupling capacitance is formed between a common electrode set to a reference potential and the signal lines, and a potential of the common electrode is varied according to the image signals that pass through the signal lines. An electromagnetic wave noise is also generated in the common electrode due to the variation in the potential in addition to the electromagnetic wave noise from the signal lines, resulting in a possibility that the capacitance touch panel malfunctions.

SUMMARY OF THE INVENTION

The invention aims at suppressing a potential variation of a common electrode which is set to a reference potential.

(1) According to the invention, there is provided a display device including: a substrate which has an image display area; pixel electrodes which are formed in the image display area of the substrate; a common electrode which is formed in the image display area of the substrate; inside signal lines which are formed inside the image display area of the substrate, and electrically connected to the pixel electrodes; outside signal lines which are formed outside the image display area of the substrate, and electrically connected to the inside signal lines; a common line which is formed inside and outside the image display area of the substrate, and electrically connected to the common electrode, in which an image is displayed under a control of a light using an electric field developed between the pixel electrodes and the common electrode, in which a coupling capacitance is formed between the inside signal lines and the common electrode, and in which at least one of the outside signal lines and the inside signal lines includes a first portion, and a second portion that is higher in electric resistance than the first portion. According to the invention, a signal that is transmitted to the inside signal lines is delayed by the height of electric resistance of the second portion when passing through the outside signal lines. A peak level of the potential variation of the common electrode which is affected by the coupling capacitance with the inside signal lines is decreased. As a result, the potential variation of the common electrode that is set to the reference potential can be suppressed.

(2) According to the invention, there is provided a display device including: a substrate which has an image display area; pixel electrodes which are formed in the image display area of the substrate; a common electrode which is formed in the image display area of the substrate; inside signal lines which are formed inside the image display area of the substrate, and electrically connected to the pixel electrodes; outside signal lines which are formed outside the image display area of the substrate; switching elements each of which switches electric continuity and discontinuity between the inside signal lines and the output signal lines; control lines which input a control signal to the switching elements; and a common line which is formed inside and outside the image display area of the substrate, and electrically connected to the common electrode, in which an image is displayed under a control of a light using an electric field developed between the pixel electrodes and the common electrode, in which a coupling capacitance is formed between the inside signal lines and the common electrode, and in which the control lines each include a first portion, and a second portion higher in electric resistance than the first portion. According to the invention, the control signal input to the switching element is delayed by the height of electric resistance of the second portion when passing through the control lines. Since the operation of the switching element is delayed with the delay of the control signal, a signal that is transmitted to the inside signal lines is delayed. As a result, since the peak level of the potential variation of the common electrode that is affected by the coupling capacitance with the inside signal lines is decreased, the potential variation of the common electrode that is set to the reference potential can be suppressed.

(3) The display device according to item (2) further includes: n of the control lines; m of the switching elements which are grouped by n of the switching elements which is the same number as that of the control lines, and controlled by the respective different control lines in each group; m of the inside signal lines which are electrically connected to the m switching elements one-on-one; and (m/n) of the outside signal lines which are each branched and electrically connected to the n switching elements in each group, in which when the control signal is input to one of the n control lines, one of the switching elements in each group connects one of the outside signal lines and one of the inside signal lines.

(4) The display device according to any one of the items (1) to (3), further includes an insulating film that covers the second portion, in which a plurality of contact holes from which the second portion is exposed is formed in the insulating film at intervals in a longitudinal direction of the second portion.

(5) The display device according to the item (4), further includes a conductive layer which is formed on the insulating film so as to be electrically connected to the second portion by two or more of the contact holes, in which the conductive layer is made of a material lower in electric resistivity than a material of the second portion.

(6) The display device according to the item (4), further includes a radiation layer which is formed on the insulating film so as to come in contact with the second portion by any one of the contact holes, in which the radiation layer is made of a material higher in thermal conductivity than a material of the second portion.

(7) In the display device according to any one of the items (1) to (6), the second portion is made of polysilicon.

(8) In the display device according to any one of the items (1) to (7), the second portion extends to draw a straight line.

(9) In the display device according to any one of the items (1) to (7), the second portion has a flexion.

(10) The display device according to any one of the items (1) to (9) further includes a touch panel that laps over the substrate.

DETAILED DESCRIPTION OF THE INVENTION

Hereinafter, embodiments of the invention will be described with reference to the accompanying drawings.

[First Embodiment]

Figure 1:
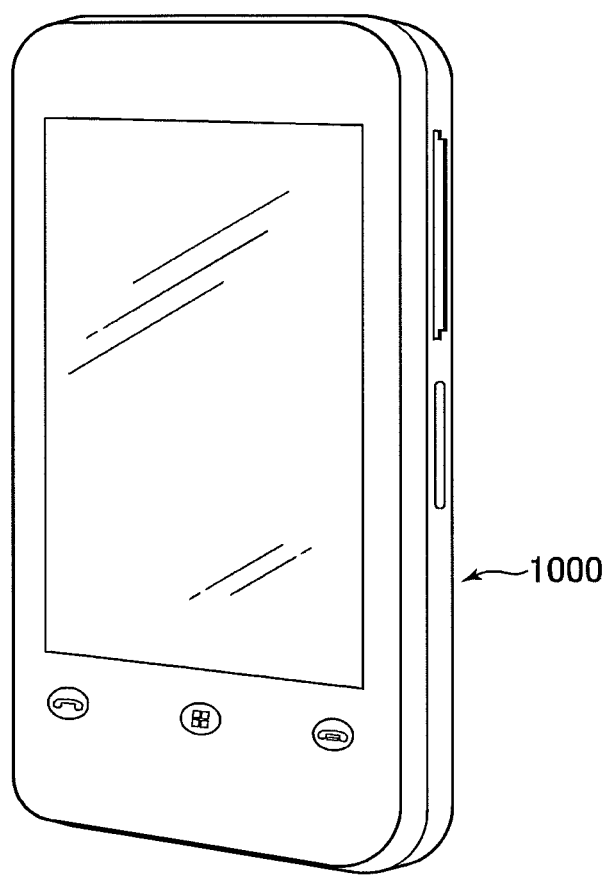
FIG. 1 is a perspective view of equipment having a display device according to a first embodiment of the invention.

FIG. 1 is a perspective view of equipment having a display device according to a first embodiment of the invention. Equipment 1000 illustrated in FIG. 1 is an example in which the display device of the invention is applied to a smart phone, and includes a touch interface.

Figure 2:
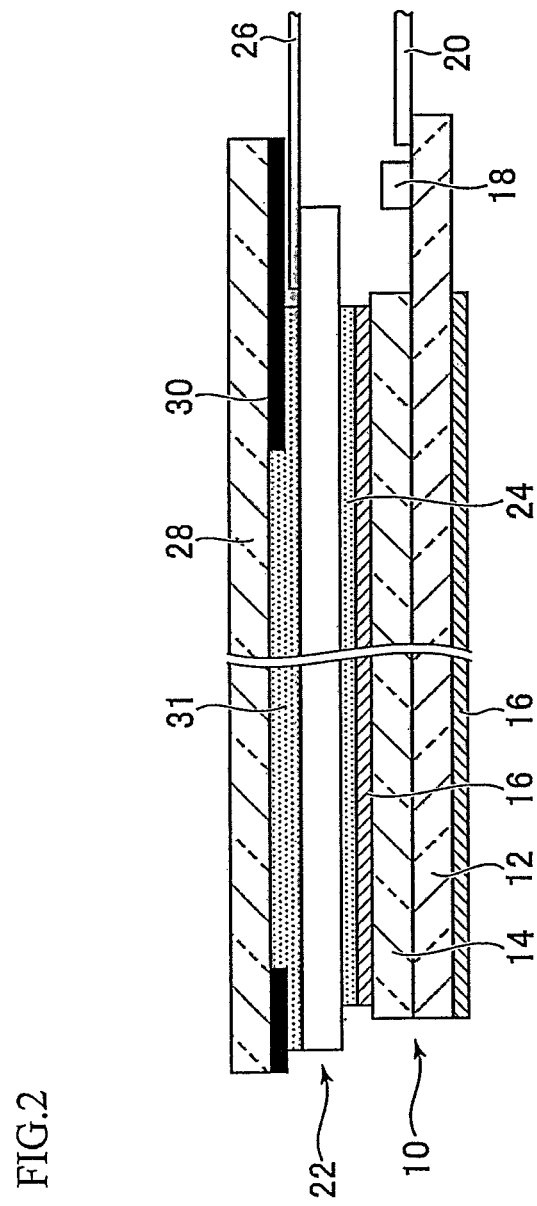
FIG. 2 is a cross-sectional view illustrating an outline of the display device according to the first embodiment of the invention.

FIG. 2 is a cross-sectional view illustrating an outline of the display device according to the first embodiment of the invention. The display device has a display panel 10. In this embodiment, the display panel 10 is configured by a liquid crystal display panel that includes a pair of substrates 12 and 14 (glass substrates), and a liquid crystal not shown is interposed between those substrates 12 and 14. Polarizing plates 16 are attached onto the respective substrates 12 and 14. An integrated circuit chip 18 that incorporates a driver circuit for driving the liquid crystal is mounted on a peripheral edge portion of one substrate 12. A flexible wiring board 20 is also attached onto the peripheral edge portion thereof. Alternatively, the display panel 10 may be configured by an organic EL (electro luminescence) panel.

The display device has a touch panel 22 (for example, capacitive type touch panel 22). The touch panel 22 and the display panel 10 are bonded together by an adhesive layer 24. Since the touch panel 22 laps with the display panel 10 that display an image, a finger input can be conducted on the image. The touch panel 22 is electrically connected with a flexible wiring board 26.

The display device has a cover substrate 28. The cover substrate 28 is made of a light transmissive material (for example, glass). A light shield film 30 is formed on the cover substrate 28 so as to surround an area where the image is displayed. A surface of the cover substrate 28 on which the light shield film 30 is formed is attached to the touch panel 22 through an adhesive layer 31.

Figure 3:
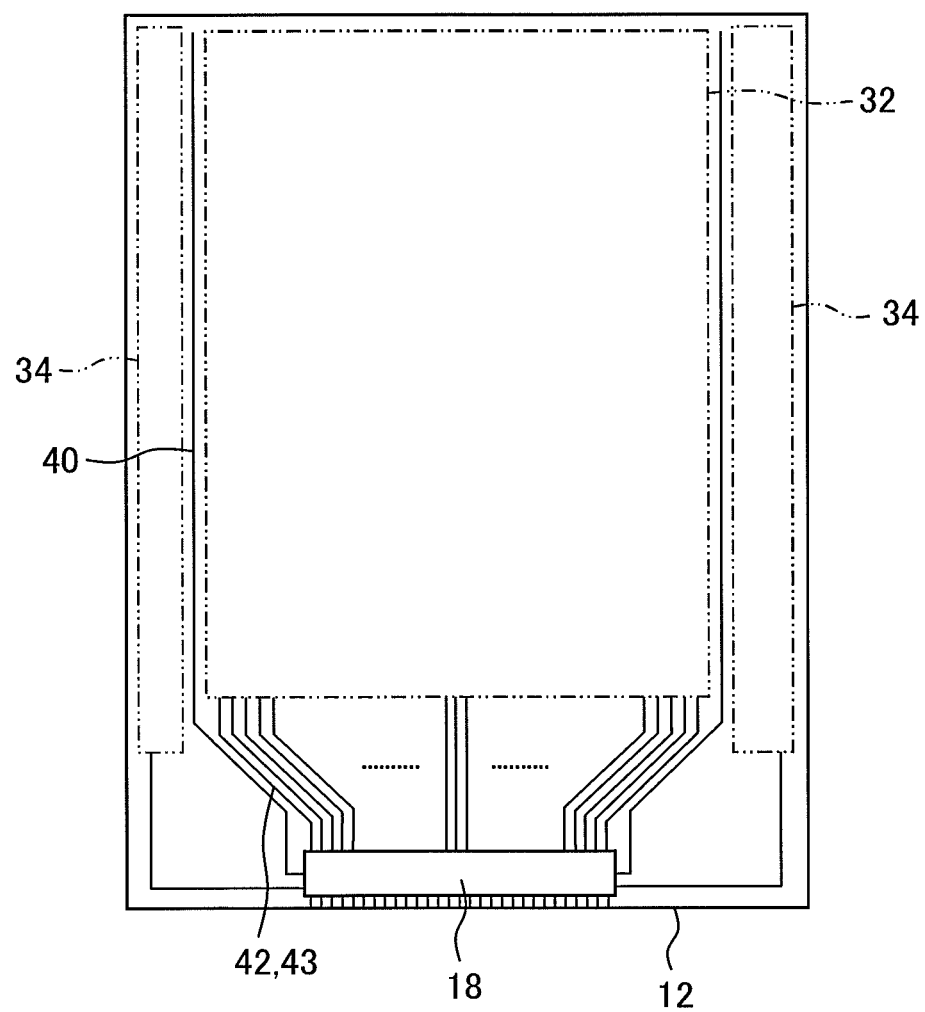
FIG. 3 is a diagram illustrating a substrate of a display panel.

FIG. 3 is a diagram illustrating the substrate 12 of the display panel 10. The substrate 12 has an image display area 32. In the image display area 32, an image is configured by a plurality of pixels. The plurality of pixels is driven by a driver circuit incorporated into the integrated circuit chip 18 also illustrated in FIG. 2 to change a level of brightness. Because the driving is conducted by a scanning system, the substrate 12 is formed with scanning circuits 34. For example, the respective scanning circuits 34 are formed adjacent to two opposite sides of the rectangular image display area 32, and the integrated circuit chip 18 is mounted adjacent to another side of the image display area 32.

Figure 4:
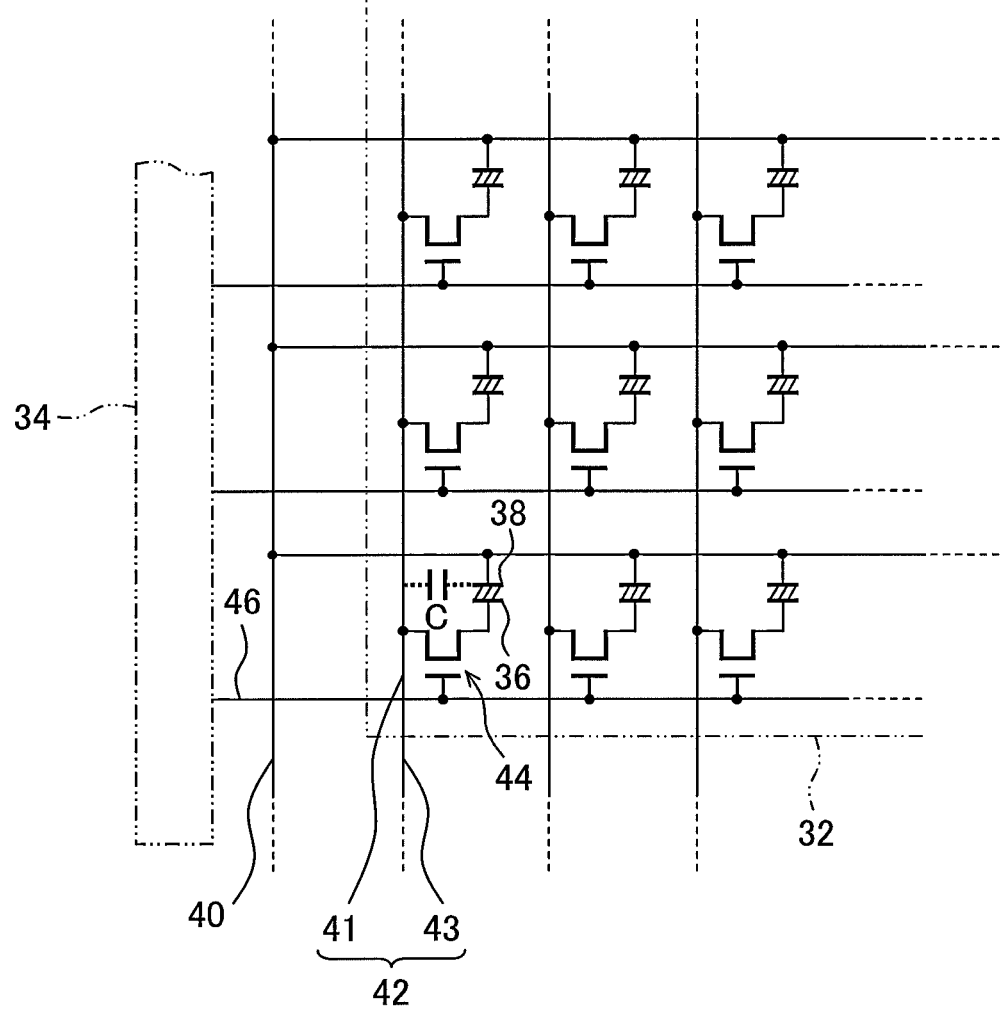
FIG. 4 is a diagram illustrating a circuit for displaying an image.

FIG. 4 is a diagram illustrating a circuit for displaying the image. Pixel electrodes 36 are formed in the image display area 32. Since the pixels are formed by the plurality of pixel electrodes 36, an area surrounding the plurality of pixel electrodes 36 configures the image display area 32. A common electrode 38 is formed in the image display area 32. A potential of the common electrode 38 is set to a reference potential (for example, GND), and a voltage corresponding to the brightness of each pixel is applied to each of the pixel electrodes 36. An image is displayed under the control (for example, driving of the liquid crystal) of the light using the electric field developed between each of the pixel electrodes 36 and the common electrode 38.

The common electrode 38 is electrically connected to a common line 40 extending inside and outside the image display area 32. The pixel electrodes 36 are electrically connected to signal lines 42. In detail, a switching element 44 (for example, thin film transistor) is connected between each of the pixel electrodes 36 and each of the signal lines 42 to conduct electric continuity and discontinuity between the pixel electrode 36 and the signal line 42. The switching element 44 is connected to each of scanning lines 46 taken out of the scanning circuit 34, and driven (turned on/off) according to a scanning signal input to the scanning line 46.

The signal line 42 includes an inside signal line 41 present inside the image display area 32, and an outside signal line 43 present outside the image display area 32. The inside signal line 41 is electrically connected to the pixel electrode 36. The inside signal line 41 is made of a material low in electric resistivity such as metal. Because the inside signal line 41 extends in proximity to the common electrode 38, a coupling capacitance C is formed between the inside signal line 41 and the common electrode 38. The potential of the common electrode 38 to be set to the reference potential is changed by the coupling capacitance C, but this embodiment has the following features for the purpose of suppressing the variation thereof.

Figure 5:
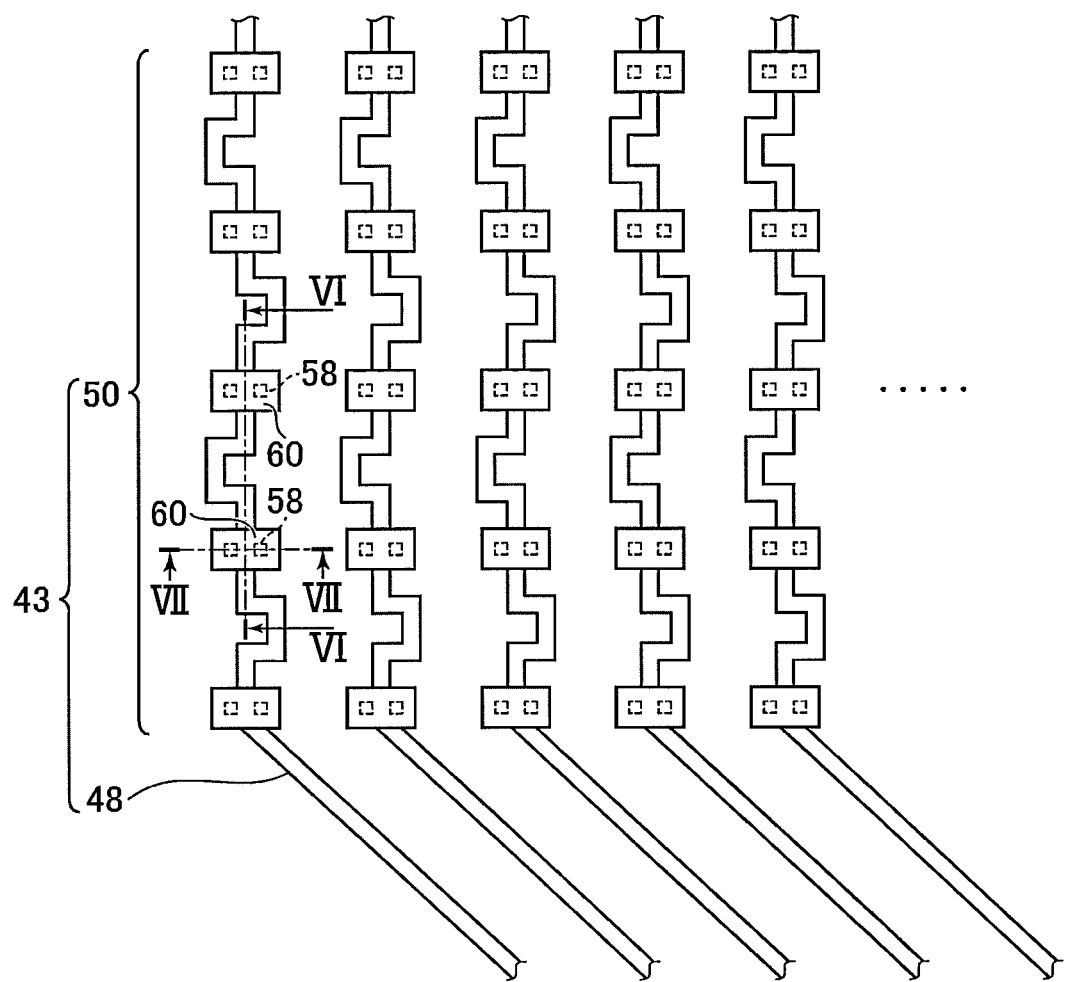
FIG. 5 is a diagram illustrating the details of an area in which outside signal lines are formed.
Figure 6:
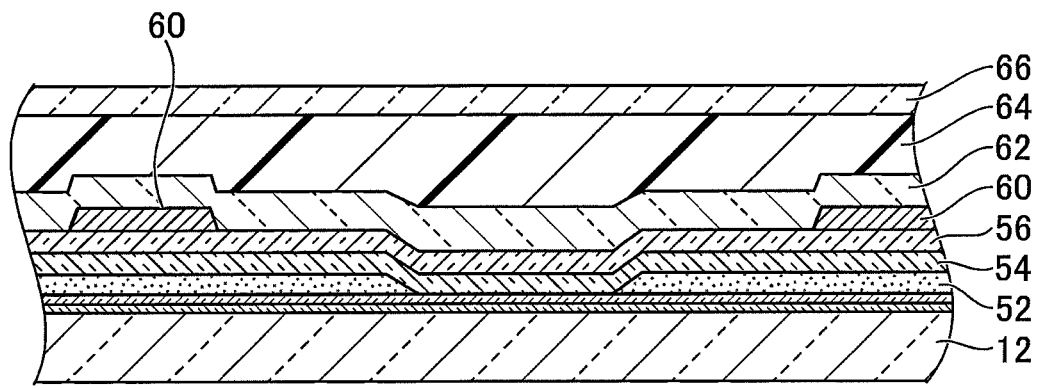
FIG. 6 is a cross-sectional view taken along a line VI-VI of the area illustrated in FIG. 5.
Figure 7:
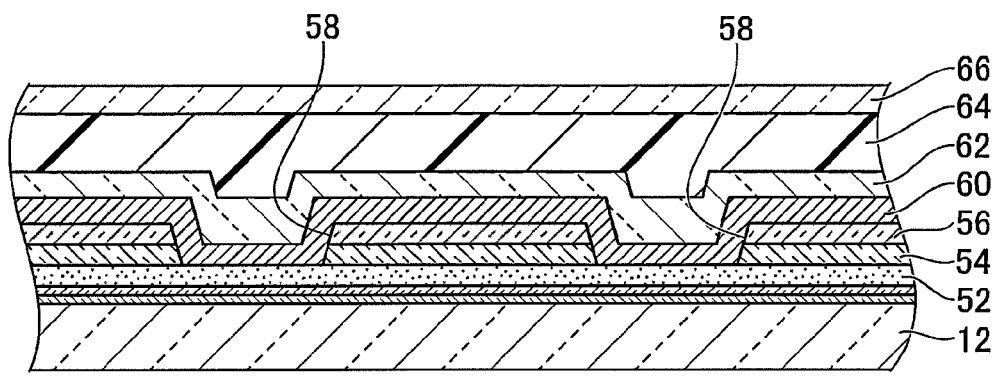
FIG. 7 is a cross-sectional view taken along a line VII-VII of the area illustrated in FIG. 5.

FIG. 5 is a diagram illustrating the details of an area in which outside signal lines are formed. FIG. 6 is a cross-sectional view taken along a line VI-VI of the area illustrated in FIG. 5. FIG. 7 is a cross-sectional view taken along a line VII-VII of the area illustrated in FIG. 5.

The outside signal line 43 includes a first portion 48 and a second portion 50. The first portion 48 is made of a material low in the electric resistivity such as metal, and may be made of the same material as that of the inside signal line 41. The second portion 50 is higher in electric resistance than the first portion 48, and made of, for example, a material (for example, semiconductor material) high in electric resistivity. Also, the second portion 50 is made of a material higher in electric resistivity than the inside signal line 41 illustrated in FIG. 4. In an example of FIG. 5, the second portion 50 is situated on a side closer to the inside signal line 41, and the first portion 48 is situated on a side farther from the inside signal line 41, and vice versa. Also, the second portion 50 may be disposed between a pair of the first portions 48, or the first portion 48 may be disposed between a pair of the second portions 50. In this embodiment, as illustrated in FIG. 3, the first portion 48 is electrically connected to a driver circuit incorporated into the integrated circuit chip 18.

In an area where the outside signal lines 43 (second portions 50) are formed, as illustrated in FIGS. 6 and 7, a plurality of films are laminated on the substrate 12. The plurality of films includes a semiconductor film 52 (for example, polysilicon film). The semiconductor film 52 configures a part of the thin film transistor (switching element 44 illustrated in FIG. 4). The semiconductor film 52 is covered with a gate insulating film 54, and the thin film transistor has a gate electrode (not shown) on the gate insulating film 54. An interlayer insulating film 56 is formed on the gate insulating film 54. In this embodiment, the second portion 50 (FIG. 5) is formed of the semiconductor film 52. More specifically, the second portion 50 is made of polysilicon.

According to this embodiment, the second portion 50 is higher in electric resistance than the first portion 48. That is, the electric resistance of a part of the outside signal line 43 is higher. Accordingly, a signal that is transmitted to the inside signal line 41 is delayed by the height of electric resistance of the second portion 50 when passing through the outside signal line 43. The signal delay decreases the peak level of the potential variation of the common electrode 38 which is affected by the coupling capacitance C with the inside signal line 41. As a result, the potential variation of the common electrode 38 set to the reference potential can be suppressed.

The second portion 50 (semiconductor film 52) is covered with an insulating film (the gate insulating film 54 and the interlayer insulating film 56). A plurality of contact holes 58 that exposes the second portion 50 (the semiconductor film 52) is formed in the insulating film (the gate insulating film 54 and the interlayer insulating film 56) at intervals in a longitudinal direction of the second portion 50 (refer to FIG. 5). An electric connection with the second portion 50 is enabled through the contact holes 58. If two portions of the second portion 50 distant from each other are electrically connected to each other through the two contact holes 58 distant from each other in the longitudinal direction of the second portion 50, an electric resistance between the two distant portions can be decreased. In the example of FIG. 5, the two contact holes 58 are aligned in a width direction of the second portion 50. This is because the electric connection with the second portion 50 is ensured.

In this embodiment, the two distant portions of the second portion 50 are not electrically connected to each other. However, a conductive layer 60 is formed over the inside of the contact holes 58 from above the insulating film (interlayer insulating film 56) so as to be electrically connected to the second portion 50 in the respective contact holes 58. That is, exposed portions of the second portion 50 from the insulating film are electrically connected to each other by the conductive layer 60. The conductive layer 60 is made of a material (for example, metal) lower in the electric resistivity than the material of the second portion 50. The electric connection of the two distant portions of the second portion 50 is enabled by merely changing a shape of the conductive layer 60. The detail will be described in the following modified example. An inorganic passivation film 62, an organic passivation film 64, and another inorganic passivation film 66 are laminated on the conductive layer 60 in the stated order.

[Modified Example]

Figure 8:
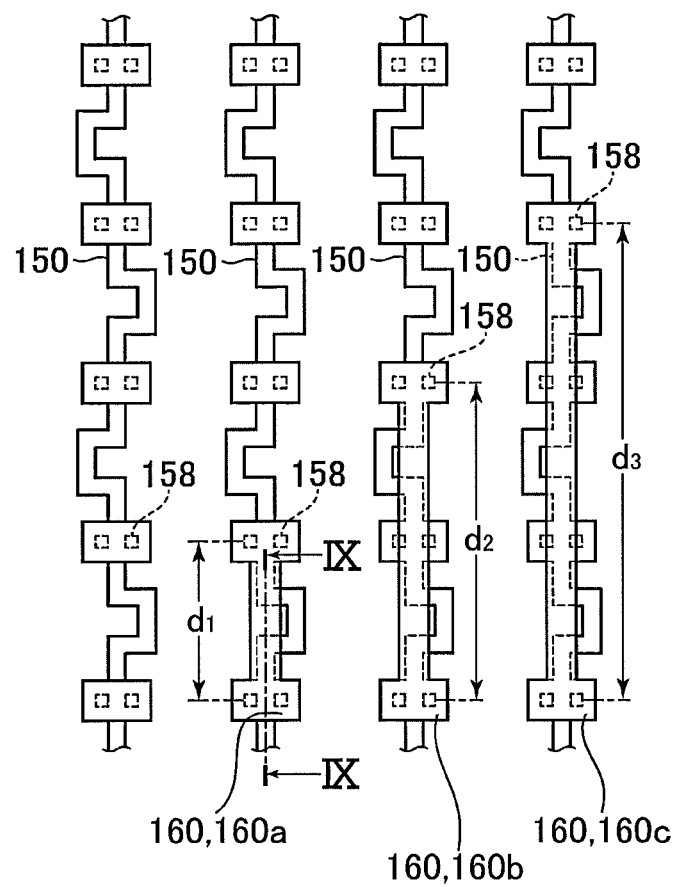
FIG. 8 is a diagram illustrating a modified example 1 of the embodiment illustrated in FIG. 5.
Figure 9:
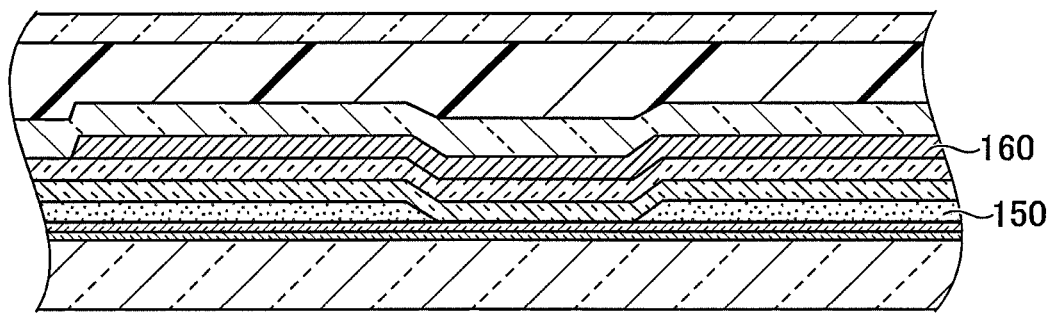
FIG. 9 is a cross-sectional view taken along a line IX-IX of the area illustrated in FIG. 8.

FIG. 8 is a diagram illustrating a modified example 1 of the embodiment illustrated in FIG. 5. FIG. 9 is a cross-sectional view taken along a line IX-IX of the area illustrated in FIG. 8. In this example, a conductive layer 160 is formed on the insulating film. The conductive layer 160 is so formed as to pass through two or more contact holes 158 distant from each other in a longitudinal direction of a second portion 150. The conductive layer 160 is electrically connected to the second portion 150 in the contact holes 158. That is, the portions of the second portion 150 distant in the longitudinal direction are electrically connected to each other by the conductive layer 160 in the two or more contact holes 158 distant from each other in the longitudinal direction of the second portion 150. Since the conductive layer 160 is lower in the electric resistance than the second portion 150, the electric resistance between the two distant portions of the second portion 150 can be decreased by the conductive layer 160. The decrease in the electric resistance makes it possible to adjust the degree of the signal delay caused by the height of electric resistance of the second portion 150.

The conductive layer 160 can electrically connect the portions of the second portion 150 present at an arbitrary distance, and can be electrically connected with the second portion 150 by an arbitrary number of contact holes 158. For example, FIG. 8 illustrates a conductive layer 160a which is electrically connected with the second portion 150 in the two contact holes 158 present at a first distance $d_1$ in the longitudinal direction of the second portion 150, a conductive layer 160b which is electrically connected with the second portion 150 in a pair of contact holes 158 present at a second distance $d_2$ in the longitudinal direction of another second portion 150, and one contact hole 158 located between those contact holes, and further a conductive layer 160c which is electrically connected with the second portion 150 in a pair of contact holes 158 present at a third distance $d_3$ in the longitudinal direction of another second portion 150, and a plurality (two) of contact holes 158 located between those contact holes.

Figure 10:
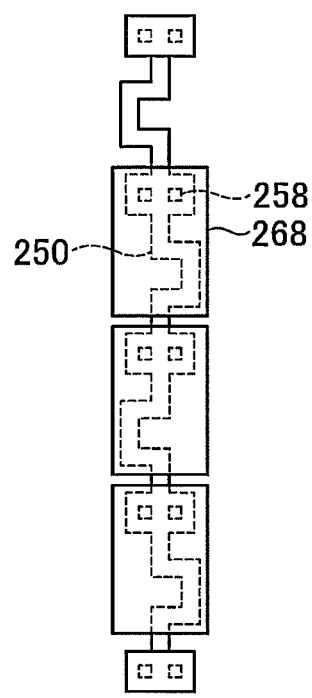
FIG. 10 is a diagram illustrating a modified example 2 of the embodiment illustrated in FIG. 5.

FIG. 10 is a diagram illustrating a modified example 2 of the embodiment illustrated in FIG. 5. In this example, a radiation layer 268 is formed on the insulating film so as to contact with a second portion 250 in any contact hole 258. The radiation layer 268 is higher in radiation property with a larger size. The radiation layer 268 is made of a material higher in the thermal conductivity than the material of the second portion 250. The radiation layer 268 may be formed of a conductive layer.

Figure 11:
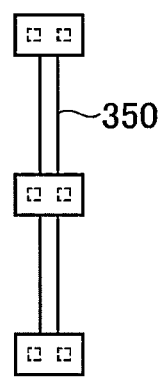
FIG. 11 is a diagram illustrating a modified example 3 of the embodiment illustrated in FIG. 5.

FIG. 11 is a diagram illustrating a modified example 3 of the embodiment illustrated in FIG. 5. In the example illustrated in FIG. 5, the second portion 50 is lengthened with the provision of the flexion to increase the overall electric resistance. On the other hand, in the example illustrated in FIG. 11, since a second portion 350 straight extends so as to draw a straight line, the electric resistance becomes relatively low.

Figure 12:
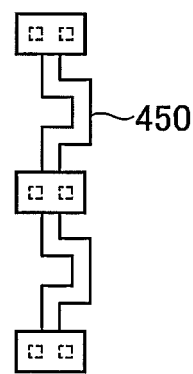
FIG. 12 is a diagram illustrating a modified example 4 of the embodiment illustrated in FIG. 5.

FIG. 12 is a diagram illustrating a modified example 4 of the embodiment illustrated in FIG. 5. In the example illustrated in FIG. 5, the second portion 50 is so bent as to alternately form convexes. On the other hand, in the example illustrated in FIG. 12, a second portion 450 is so bent as to form the convexes in the same direction.

Figure 13:
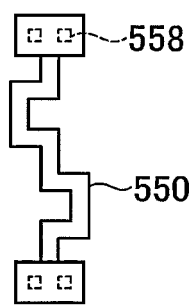
FIG. 13 is a diagram illustrating a modified example 5 of the embodiment illustrated in FIG. 5.

FIG. 13 is a diagram illustrating a modified example 5 of the embodiment illustrated in FIG. 5. The second portion 50 illustrated in FIG. 5 is so bent as to form one convex between a pair of contact holes 58 distant in the longitudinal direction of the second portion 50. On the contrary, a second portion 550 illustrated in FIG. 13 is so bent as to form a plurality (for example, two) of convexes between a pair of contact holes 558 distant in the longitudinal direction of the second portion 550. The plurality of convexes may be protruded in opposite directions to each other as illustrated in FIG. 13, or may be protruded in the same direction.

Figure 14:
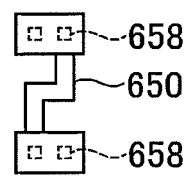
FIG. 14 is a diagram illustrating a modified example 6 of the embodiment illustrated in FIG. 5.

FIG. 14 is a diagram illustrating a modified example 6 of the embodiment illustrated in FIG. 5. In this example, a second portion 650 is bent into a crank shape between a pair of contact holes 658 distant in the longitudinal direction of the second portion 650.

[Second Embodiment]

Figure 15:
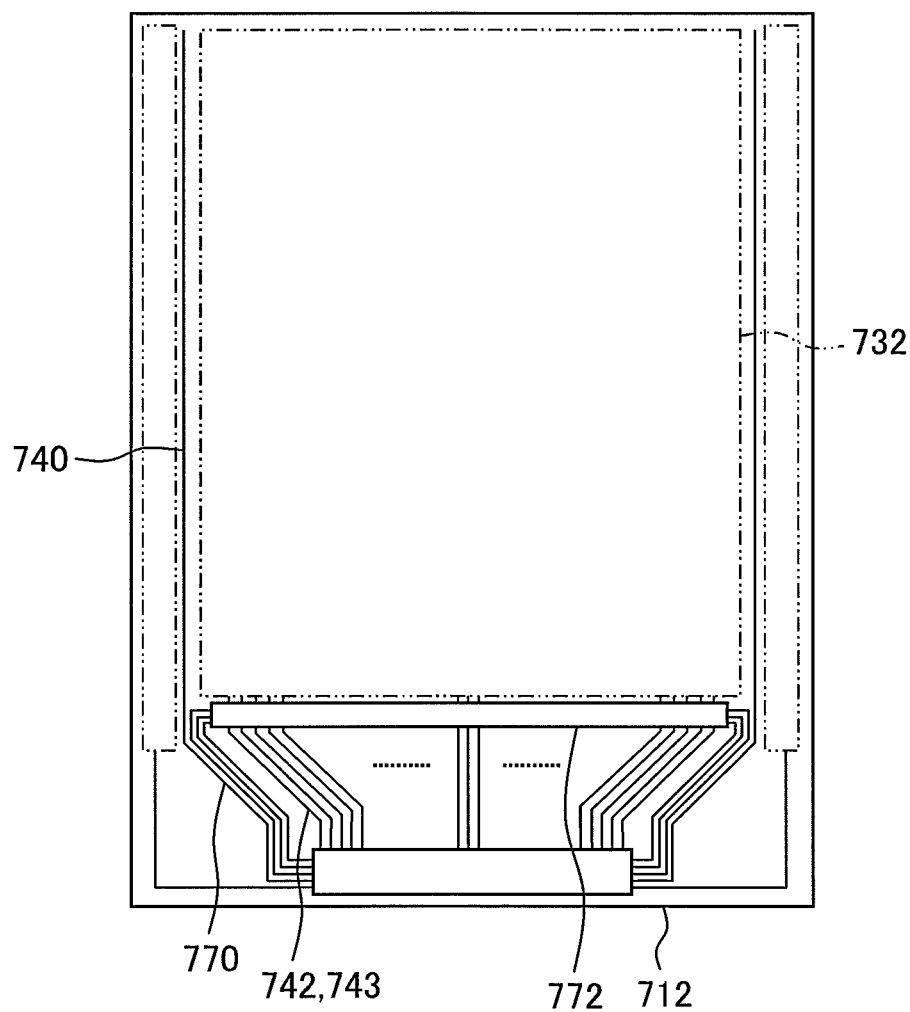
FIG. 15 is a diagram illustrating a substrate of a display panel provided in a display device according to a second embodiment of the invention.
Figure 16:
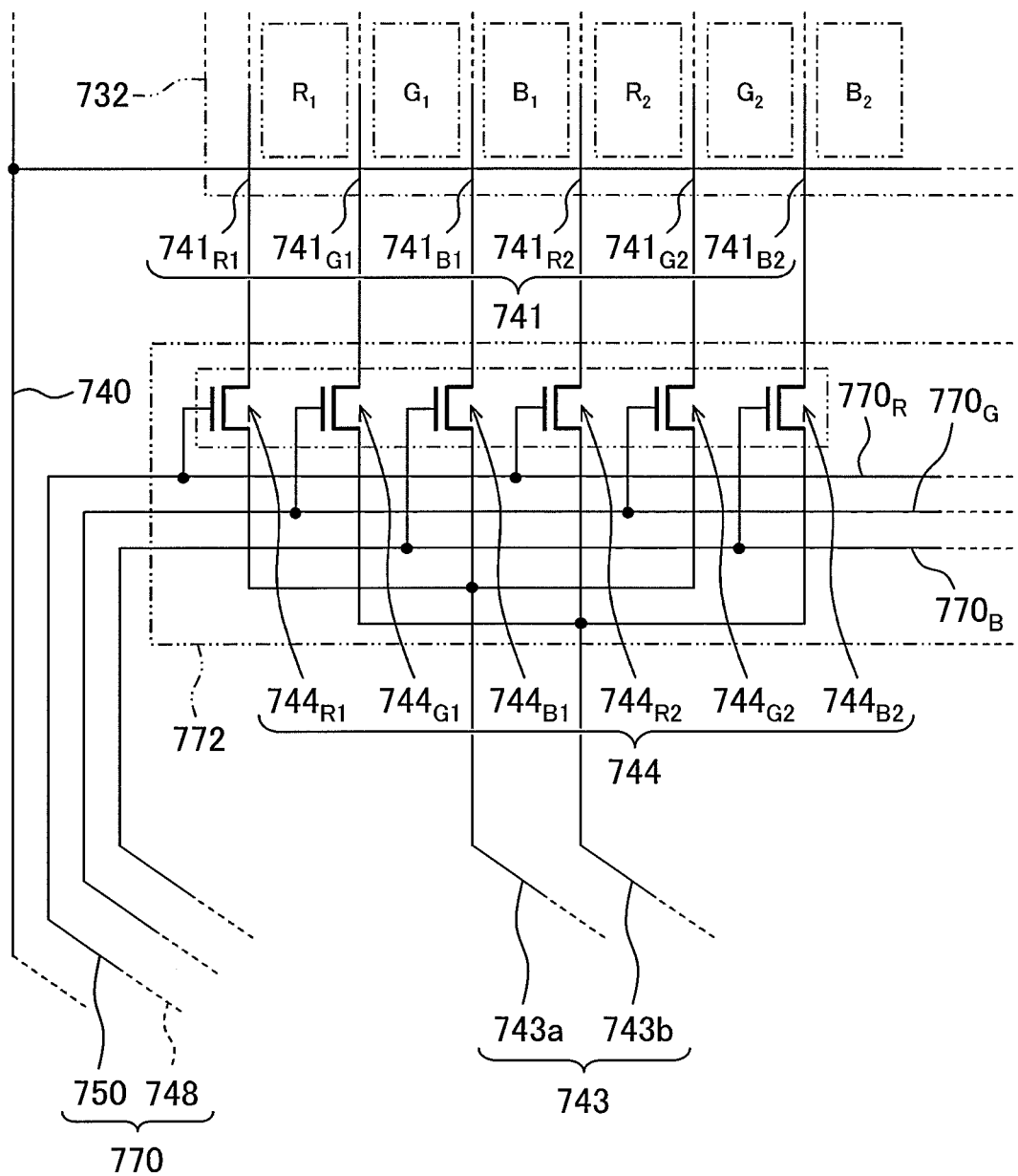
FIG. 16 is a diagram illustrating a circuit for displaying an image.

FIG. 15 is a diagram illustrating a substrate of a display panel provided in a display device according to a second embodiment of the invention. FIG. 16 is a diagram illustrating a circuit for displaying an image.

The display device includes a substrate 712 having an image display area 732. Inside signal lines 741 are formed inside the image display area 732. Outside signal lines 743 are formed outside the image display area 732. A common line 740 is so formed as to pass inside and outside the image display area 732.

The display device according to this embodiment includes the pixel electrodes 36 and the common electrode 38 described in the first embodiment illustrated in FIG. 4, and displays an image under the control of a light using an electric field developed between the pixel electrodes 36 and the common electrode 38. The details are identical with those described in the first embodiment. This embodiment is also identical with the first embodiment in that the coupling capacitance C is formed between the inside signal line 41 and the common electrode 38.

As illustrated in FIG. 16, the display device according to this embodiment is different from the first embodiment in that an RGB selector circuit 772 is provided. The number of outside signal lines 743 can be reduced by the RGB selector circuit 772.

In more detail, the RGB selector circuit 772 has m (m=6 in FIG. 16) switching elements 744. The respective switching elements 744 switch electric continuity and discontinuity between the inside signal lines 741 and the outside signal lines 743. The respective switching elements 744 receive control signals from control lines 770. When the control signals are input to the respective control lines 770, the respective switching elements 744 connect the outside signal lines 743 to the inside signal lines 741.

The number of control lines 770 is n (n=3 in FIG. 16). The m switching elements 744 are grouped by n switching elements 744 which is the same number as that of the control lines 770. The n switching elements 744 in each group are controlled by the respective different control lines 770. The m switching elements 744 are electrically connected to the m inside signal lines 741 one-on-one. Each of the (m/n) outside signal lines 743 is branched into n lines so as to be electrically connected to the n switching elements in each group. When the control signal is input to one of the n control lines 770, one switching element 744 in each group connects one outside signal line 743 and one inside signal line 741.

A plurality of pixels aligned along one scanning line (not shown) has red pixels $R_1, R_2, \ldots$, green pixels $G_1, G_2, \ldots$, and blue pixels $B_1, B_2, \ldots$. The control lines 770 are connected to the RGB selector circuit 772 so as to select any color. For that reason, the number of pixel colors (three colors of RGB) is identical with the number of control lines 770. When any color is selected by the control lines 770, a signal is input to the pixels of the selected color from signal lines 742 (outside signal lines 743).

For example, when the red pixels $R_1$ and $R_2$ are selected, the control signal is input to a control line $770_R$. Then, the switching element $744_{R1}$ and the switching elements $744_{R2}$ turn on to connect the outside signal line 743a and the inside signal line $741_{R1}$, and connect the outside signal line 743b and the inside signal line $741_{R2}$. In this situation, the signals corresponding to the red pixels $R_1$ and $R_2$ are input to the outside signal line 743a and the outside signal line 743b, respectively, to display the red pixels $R_1$ and $R_2$ according to the signal.

When the green pixels $G_1$ and $G_2$ are selected, the control signal is input to a control line $770_G$. Then, the switching element $744_{G1}$ and the switching elements $744_{G2}$ turn on to connect the outside signal line 743a and the inside signal line $741_{G2}$, and connect the outside signal line 743b and the inside signal line $741_{G1}$. In this situation, the signals corresponding to the green pixels $G_1$ and $G_2$ are input to the outside signal line 743a and the outside signal line 743b, respectively, to display the green pixels $G_1$ and $G_2$ according to the signal.

When the blue pixels $B_1$ and $B_2$ are selected, the control signal is input to a control line $770_B$. Then, the switching element $744_{B1}$ and the switching elements $744_{B2}$ turn on to connect the outside signal line 743a and the inside signal line $741_{B1}$, and connect the outside signal line 743b and the inside signal line $741_{B2}$. In this situation, the signals corresponding to the blue pixels $B_1$ and $B_2$ are input to the outside signal line 743a and the outside signal line 743b, respectively, to display the blue pixels $B_1$ and $B_2$ according to the signal.

Figure 17:
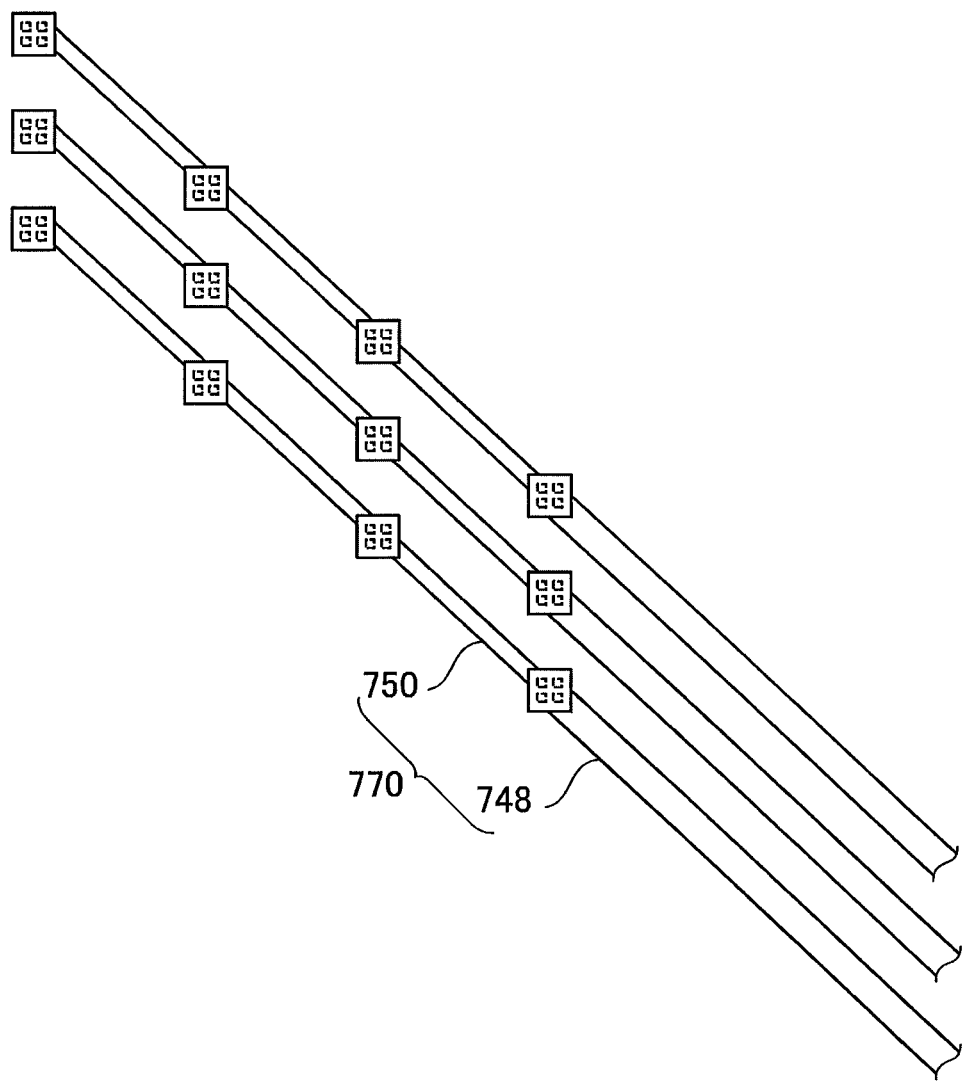
FIG. 17 is a diagram illustrating control lines.

FIG. 17 is a diagram illustrating the control lines 770. Each of the control lines 770 includes a first portion 748 and a second portion 750. The first portion 748 is made of a material low in electric resistivity such as metal, and may be made of the same material as that of the inside signal lines 741. The second portion 750 is higher in electric resistance than the first portion 748. In this example, the second portion 750 is formed thinner (narrower in width) than the first portion 748 so as to increase the electric resistance. Accordingly, the second portion 750 is made of the same material (for example, metal) as that of the first portion 748. This is also applicable to the first embodiment. Conversely, as described in the first embodiment, the second portion 750 may be made of a material (for example, semiconductor material such as polysilicon) higher in electric resistivity than that of the first portion 748 or the inside signal lines 741.

According to this embodiment, the control signal that is input to the switching elements 744 is delayed by the height of electric resistance of the second portion 750 when passing through the control line 770. Since the delay of the control signal delays the operation of the switching elements 744, the signal which is transmitted to the inside signal lines 741 is delayed. This decreases the peak level of the potential variation of the common electrode (not shown) which is affected by the coupling capacitance with the inside signal lines 741. As a result, the potential variation of the common electrode (not shown) set to the reference potential can be suppressed.

[Modified Example]

Figure 18:
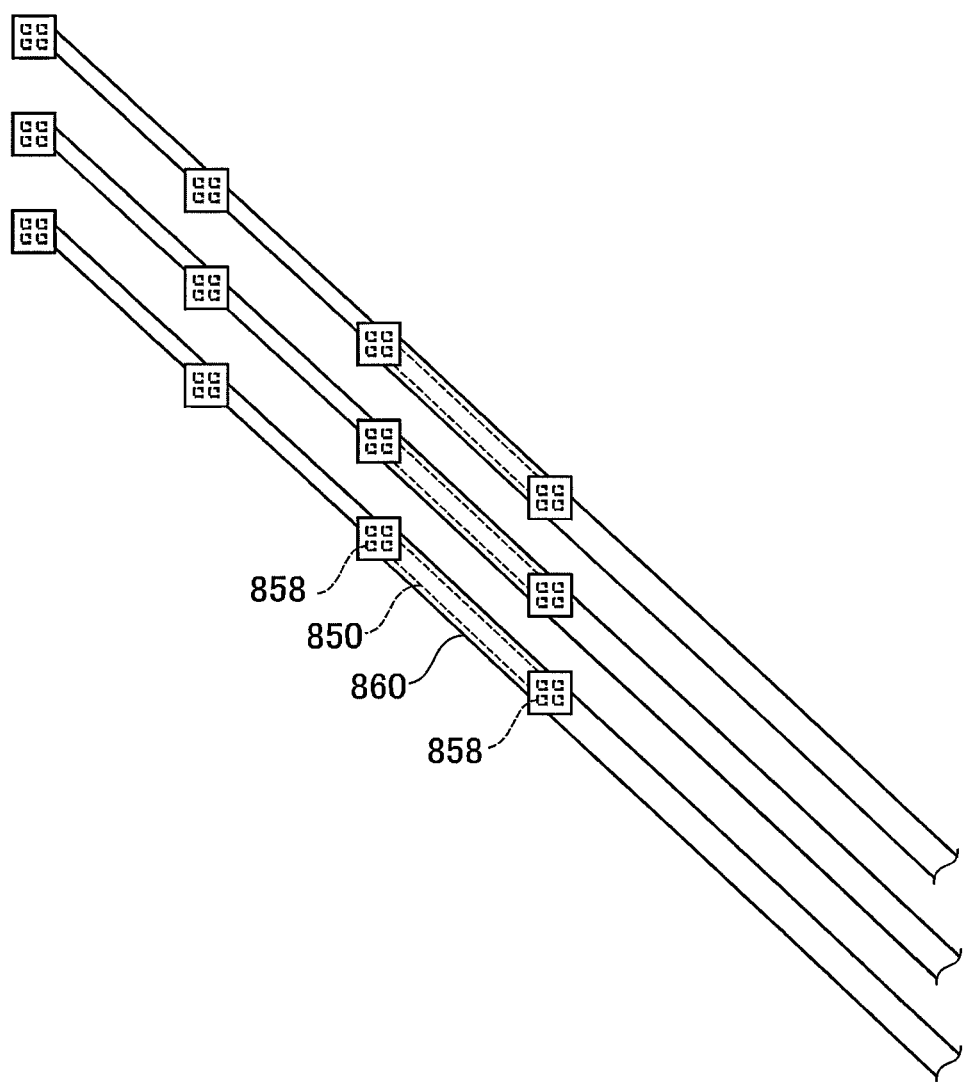
FIG. 18 is a diagram illustrating a modified example 1 of the second embodiment.

FIG. 18 is a diagram illustrating a modified example 1 of the second embodiment. In this example, a conductive layer 860 is so formed as to be electrically connected to a second portion 850. In more detail, although the second portion 850 is made of metal, the second portion 850 is high in the electric resistance because of a thin configuration. The portions of the second portion 850 distant in the longitudinal direction are electrically connected by the conductive layer 860 in two or more contact holes 858 distant in the longitudinal direction of the second portion 850. Since the conductive layer 860 is wider in width than the second portion 850, the electric resistance becomes low. For that reason, the electric resistance between the two distant portions of the second portion 850 can be decreased by the conductive layer 860. The decrease in the electric resistance makes it possible to adjust the degree of the signal delay caused by the height of electric resistance of the second portion 850.

Figure 19:
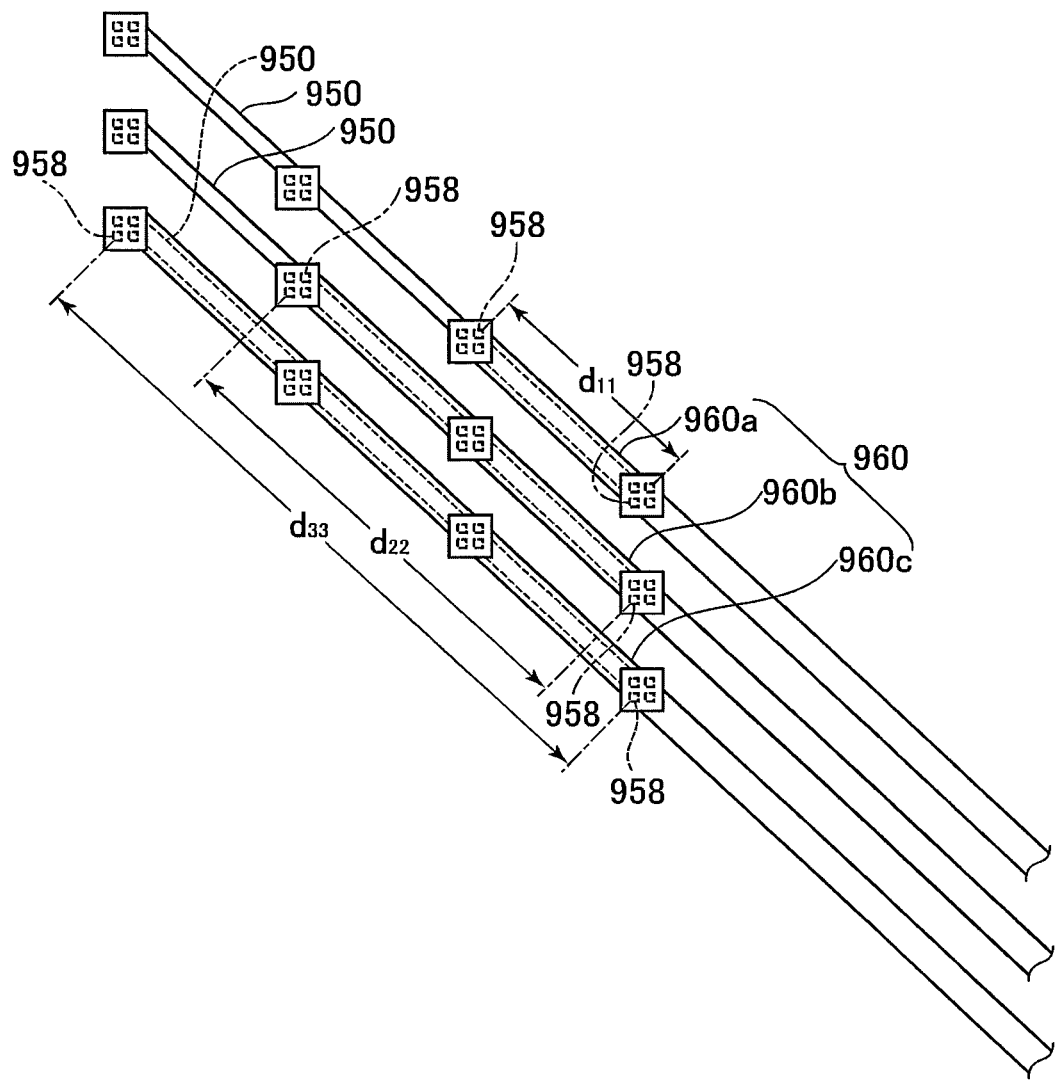
FIG. 19 is a diagram illustrating a modified example 2 of the second embodiment.

FIG. 19 is a diagram illustrating a modified example 2 of the second embodiment. Similarly, in this example, a conductive layer 960 can electrically connect portions of a second portion 950 present at an arbitrary distance, and can be electrically connected with the second portion 950 by contact holes 958 of an arbitrary number. For example, FIG. 19 illustrates a conductive layer 960a which is electrically connected with the second portion 950 in the two contact holes 958 present at a first distance $d_{11}$ in the longitudinal direction of the second portion 950, a conductive layer 960b which is electrically connected with the second portion 950 in a pair of contact holes 958 present at a second distance $d_{22}$ in the longitudinal direction of another second portion 950, and one contact hole 958 located between those contact holes, and further a conductive layer 960c which is electrically connected with the second portion 950 in a pair of contact holes 958 present at a third distance $d_{33}$ in the longitudinal direction of another second portion 950, and a plurality (two) of contact holes 958 located between those contact holes.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
a substrate having an image display area;
pixel electrodes formed in the image display area of the substrate;
a common electrode formed in the image display area of the substrate;
inside signal lines formed inside the image display area of the substrate, and electrically connected to the pixel electrodes;
outside signal lines formed outside the image display area of the substrate, and electrically connected to the inside signal lines; and
a common line formed inside and outside the image display area of the substrate, and electrically connected to the common electrode;
wherein an image is displayed under control of a light using an electric field developed between the pixel electrodes and the common electrode;
wherein a coupling capacitance is formed between the inside signal lines and the common electrode;
wherein the outside signal lines include a first portion, and a second portion that is higher in electric resistance than an electric resistance of the first portion; and
wherein the second portion has a bend.

2. The display device according to claim 1, further comprising:
an insulating film that covers the second portion;
wherein a plurality of contact holes from which the second portion is exposed is formed in the insulating film at intervals in a longitudinal direction of the second portion.

3. The display device according to claim 2, further comprising:
a conductive layer formed on the insulating film so as to be electrically connected to the second portion by at least two of the contact holes;
wherein the conductive layer is made of a material lower in electric resistivity than an electric resistivity of a material of the second portion.

4. The display device according to claim 1,
wherein the second portion is made of polysilicon.

5. The display device according to claim 1,
wherein the second portion extends from the bend so as to draw a straight line.

6. A display device comprising:
a substrate having an image display area;
pixel electrodes formed in the image display area of the substrate;
a common electrode formed in the image display area of the substrate;
inside signal lines formed inside the image display area of the substrate, and electrically connected to the pixel electrodes;
outside signal lines formed outside the image display area of the substrate;
switching elements each of which switches electric continuity and discontinuity between the inside signal lines and the outside signal lines;
control lines that input a control signal to the switching elements; and
a common line formed inside and outside the image display area of the substrate, and electrically connected to the common electrode,
wherein an image is displayed under control of a light using an electric field developed between the pixel electrodes and the common electrode;
wherein a coupling capacitance is formed between the inside signal lines and the common electrode;
wherein the control lines each include a first portion, and a second portion higher in electric resistance than an electric resistance of the first portion, and
wherein the first portion has a width wider than a width of the second portion.

7. The display device according to claim 6, further comprising:
an insulating film that covers the second portion;
wherein a plurality of contact holes from which the second portion is exposed is formed in the insulating film at intervals in a longitudinal direction of the second portion.

8. The display device according to claim 7, further comprising:
a conductive layer formed on the insulating film so as to be electrically connected to the second portion by at least two of the contact holes;

wherein the conductive layer is made of a material lower in electric resistivity than an electric resistivity of a material of the second portion.

9. The display device according to claim 6,
wherein the second portion is made of polysilicon.

10. The display device according to claim 6,
wherein the second portion extends so as to draw a straight line.

* * * * *